United States Patent [19]

Van Steen

[11] Patent Number: 5,297,358
[45] Date of Patent: Mar. 29, 1994

[54] DEVICE FOR APPLYING A LIQUID TO A CROP

[76] Inventor: Henricus J. M. Van Steen, Klutenweg No. 22, NL-8314 PD Bant, Netherlands

[21] Appl. No.: 785,485

[22] Filed: Oct. 31, 1991

[30] Foreign Application Priority Data

Oct. 31, 1990 [NL] Netherlands ............ 9002372

[51] Int. Cl.$^5$ ............................................. A01G 13/00
[52] U.S. Cl. ............................................. 47/1.5
[58] Field of Search ..................................... 47/1.5

[56] References Cited

U.S. PATENT DOCUMENTS

| | | | |
|---|---|---|---|
| 480,047 | 8/1892 | Steitz | 47/1.5 |
| 1,527,669 | 2/1925 | Camp | 47/1.5 |
| 2,158,115 | 5/1939 | Fullilove | 47/1.5 |
| 2,223,809 | 12/1940 | Rucker | 47/1.5 |
| 2,935,818 | 5/1960 | Crane | 47/1.5 |
| 2,988,849 | 6/1961 | Laughlin | 47/1.5 |
| 3,021,642 | 2/1962 | Ewing | 47/1.5 |
| 4,369,596 | 1/1983 | Hartford . | |
| 4,446,650 | 5/1984 | Davis | 47/1.5 |
| 4,642,937 | 2/1987 | McKelvey | 47/1.5 |
| 4,748,769 | 6/1988 | Kolskog et al. | 47/1.5 |
| 4,884,362 | 12/1989 | Speidel . | |
| 4,908,981 | 3/1990 | Moore . | |

FOREIGN PATENT DOCUMENTS

| | | | |
|---|---|---|---|
| 2322538 | 4/1977 | France | 47/1.5 |
| 2428395 | 2/1980 | France | 47/1.5 |
| 7807030 | 1/1980 | Netherlands . | |
| 1508709 | 4/1978 | United Kingdom . | |
| 2083732 | 3/1982 | United Kingdom | 47/1.5 |

OTHER PUBLICATIONS

Century catalog dated Jun. 1981.

*Primary Examiner*—Ramon S. Britts
*Assistant Examiner*—Joanne C. Downs
*Attorney, Agent, or Firm*—Webb, Burden, Ziesenheim & Webb

[57] ABSTRACT

A method for applying a liquid to a crop (8;13) according to the invention comprises of moving a body (2) containing the liquid over the crop (8;13) such that the body (2) comes at least partially into liquid transferring contact with the crop (8;13). Plants (13;8;23) not for treatment with the liquid may be shielded from the body (2). Another liquid may simultaneously be applied to the shielded plants.

The method is preferably performed using a device comprising a displaceable frame (1;21;31) having arranged thereon at least one liquid transfer body (2) connected to a container (16) for the liquid. The body (2) may have a flexible part (12), for instance a textile material. The device may further comprise means (7;17;27) for shielding plants (8;13;23) not for treatment with the liquid, and liquid distributing means debouching inside the shielding means and connected to a container for another liquid. The shielding means may further be fitted with adjustable cutting means (9).

13 Claims, 5 Drawing Sheets

DEVICE FOR APPLYING A LIQUID TO A CROP

BACKGROUND OF THE INVENTION

The invention relates to a method for applying a liquid to a crop, and to a device for performing this method.

It is generally known to apply liquids to a crop, for instance to weed plants in order to control those weeds or to a cultivated crop to further a healthy growth of the crop. For this purpose the liquid for applying is generally atomized and spread over the crop for treating by means of a spray installation arranged on an agricultural tractor or under a crop-spraying aircraft. This known method has the great drawback that the sprayed liquid can be blown about whereby it comes to rest for instance on land located adjacent to the field for treating, whereby the crop growing there can be adversely affected. This blowing about moreover has the consequence that more liquid has to be used than is actually necessary for treating the crop and that the excess liquid is taken up into the environment. In addition, the atomized liquid can cause a health risk to people present in the field for treating or in the vicinity.

SUMMARY OF THE INVENTION

The invention therefore has for its object to provide a method for applying a liquid to a crop wherein the above stated drawbacks do not occur. This is achieved according to the invention by a method comprising of moving a body containing the liquid over the crop such that the body comes at least partially into liquid transferring contact with the crop. Thus obtained is a very efficient transfer of liquid onto a crop that does not form any danger to the environment and public health.

In preference plants not for treatment with the liquid are shielded from the body. This is of particular importance when the liquid is a non-selective weed killer which must not come into contact with the cultivated crop.

Preferably, another liquid is simultaneously applied to the shielded plants, so that cultivated crop treatment and weed control may be performed at the same time, thus resulting in appreciable savings.

The invention also relates to a device for applying a liquid to a crop with which the method according to the invention can be performed. This is achieved according to the invention by a device comprising a displaceable frame having arranged thereon at least one liquid transfer body connected to a container for the liquid. By moving the frame for example by means of a farm tractor along the crop the liquid is spread over the crop in efficient and safe manner.

The body preferably has a flexible part. The body can hereby adapt in simple manner to the shape of a crop for treating, whereby the transfer of liquid is improved and the risk of damage to the crop is reduced.

The flexible part can for instance be a textile material. By moving the body over the crop such that the textile material comes into liquid transferring contact with the crop the latter is as it were "mopped".

In order to prevent a cultivated crop being adversely affected by a weed control liquid to be applied using the device or a weed coming into contact with a growth furthering liquid, the device can comprise means for shielding plants not for treatment with the liquid.

In order to be able to perform several treatments simultaneously, the device according to the invention preferably comprises liquid distributing means debouching inside the shielding means and connected to a container for another liquid.

In a preferred embodiment, the shielding means have the shape of carriages having substantially a reversed U-shape, and the liquid distributing means are formed by spray nozzles arranged in sidewalls of the carriages.

For preventing plants that have accidentally been treated to incur or cause damage, the device preferably has adjustable cutting means arranged on the sidewalls of the carriages.

BRIEF DESCRIPTION OF THE DRAWINGS

Mentioned and other features of the method and device according to the invention are elucidated hereinafter in the light of a number of embodiments, wherein reference is made to the annexed drawing in which corresponding components are designated with corresponding reference numerals, and wherein.

DESCRIPTION OF THE PREFERRED EMBODIMENTS

Figure 1:
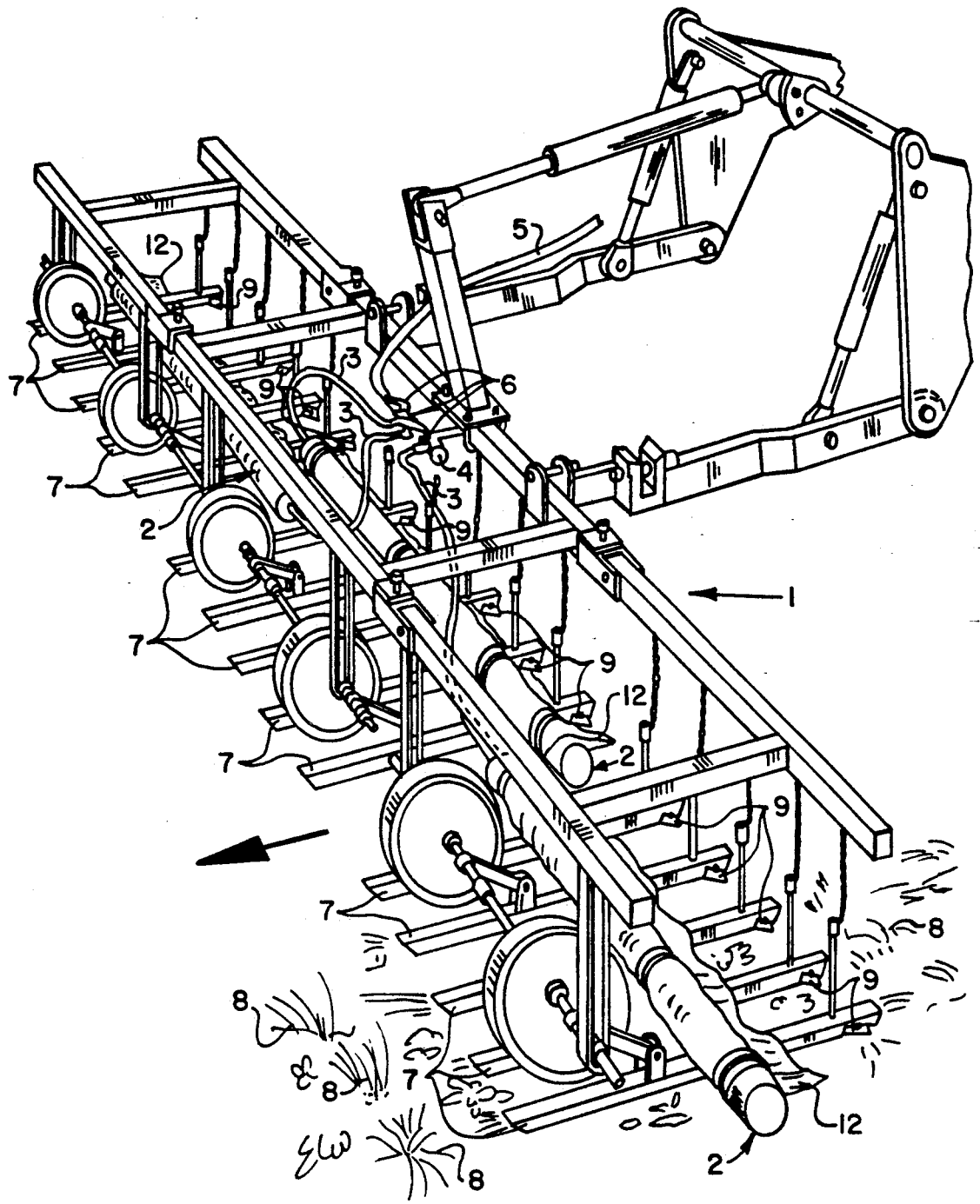
FIG. 1 shows a perspective view of a first embodiment of the device according to the invention for use on a cultivated crop planted or sown in rows.

A device for applying a liquid to a crop comprises a frame 1 (FIG. 1) which is arranged (in this case at the front) on an agricultural tractor. Arranged on the frame 1 are three liquid transfer bodies 2, each of which is connected over a conduit 3 to a faucet block 4 from which a common feed conduit 5 runs to a container (not shown here) for the liquids. The faucet block 4 has three faucets 6 for dosed feeding of liquid to the liquid transfer bodies 2.

The liquid transfer means 2 are supported by carriages 7 movably connected to the frame 1. The carriages 7 slide over the ground and thus hold the bodies 2 at virtually constant distance from the ground. In addition the carriages 7 function as shielding means because they have a profile shape such that they shield the cultivated crop 8 planted or sown in rows from the bodies 2. Each carriage 7 also has on either side cutting means 9 which cut off those portions of a plant of the cultivated crop 8 which have come into contact with the liquid from the body 2 despite the shielding means, in order to prevent the whole of this plant dying off. Because the device has three separate liquid transfer bodies 2 and the frame 1 consists of three mutually pivotable parts, the device adapts simply to irregularities in the land for treating. The device moreover occupies little storage space when the pivoting parts of the frame 1 are folded up.

Figure 2:
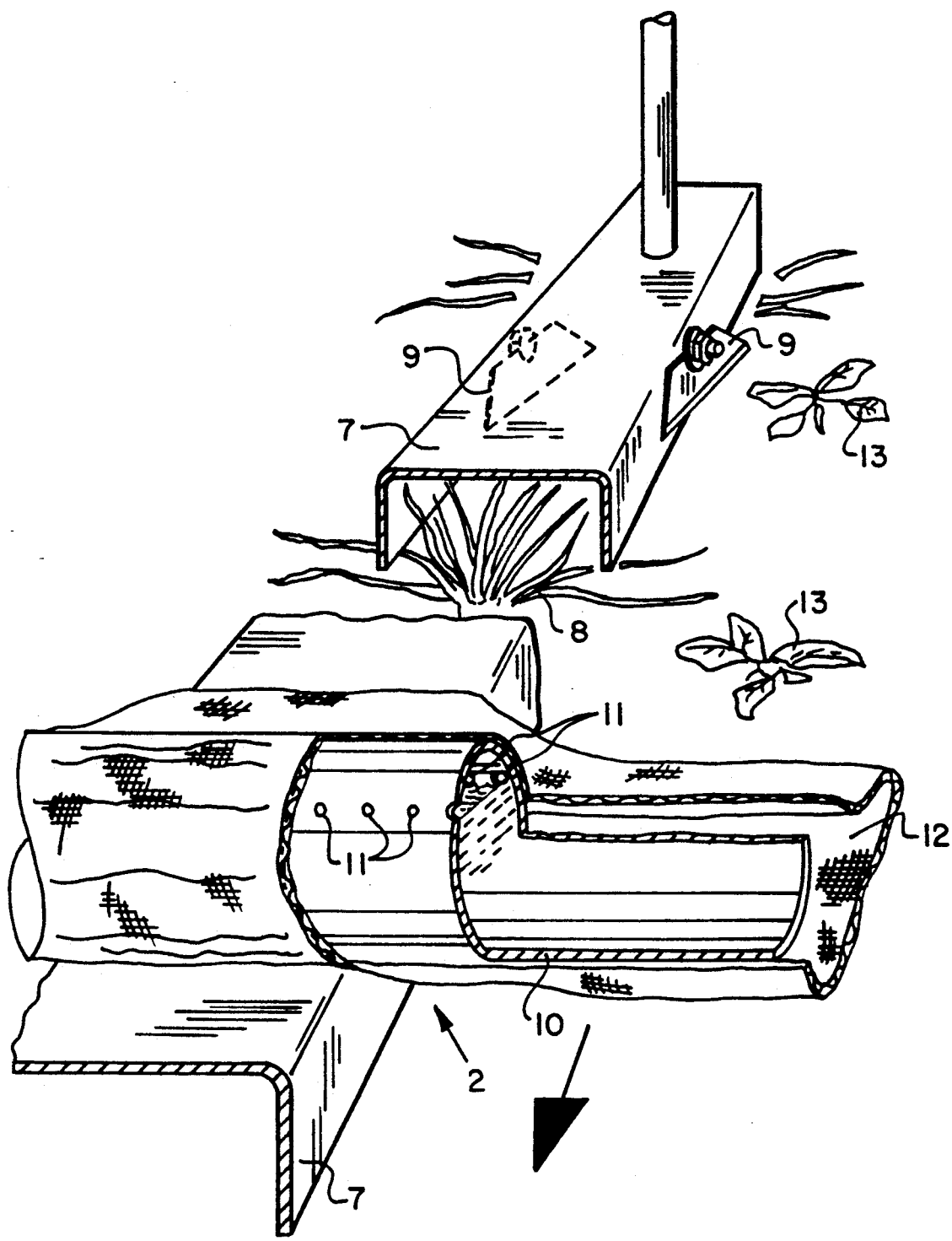
FIG. 2 is a partly sectional perspective detail view of a liquid transfer body according to the invention.

Each liquid transfer body 2 (FIG. 2) comprises a tubular member 10 provided with openings 11 arranged therein at regular intervals, and a flexible portion in the form of a textile material 12. This textile material or cloth 12 is wetted with the liquid flowing out of the openings 11 and distributes this liquid onto the crop for treating, in the case shown here onto the weeds 13 for controlling. Because the openings 11 are arranged in the upper half of the tubular member 10 this member 10 always contains a supply of liquid the weight of which holds the carriages 7 pressed against the ground. The cutting means 9 are clamped by means of a bolt/nut connection against the carriage 7 and can be simply adjusted.

Figure 3:
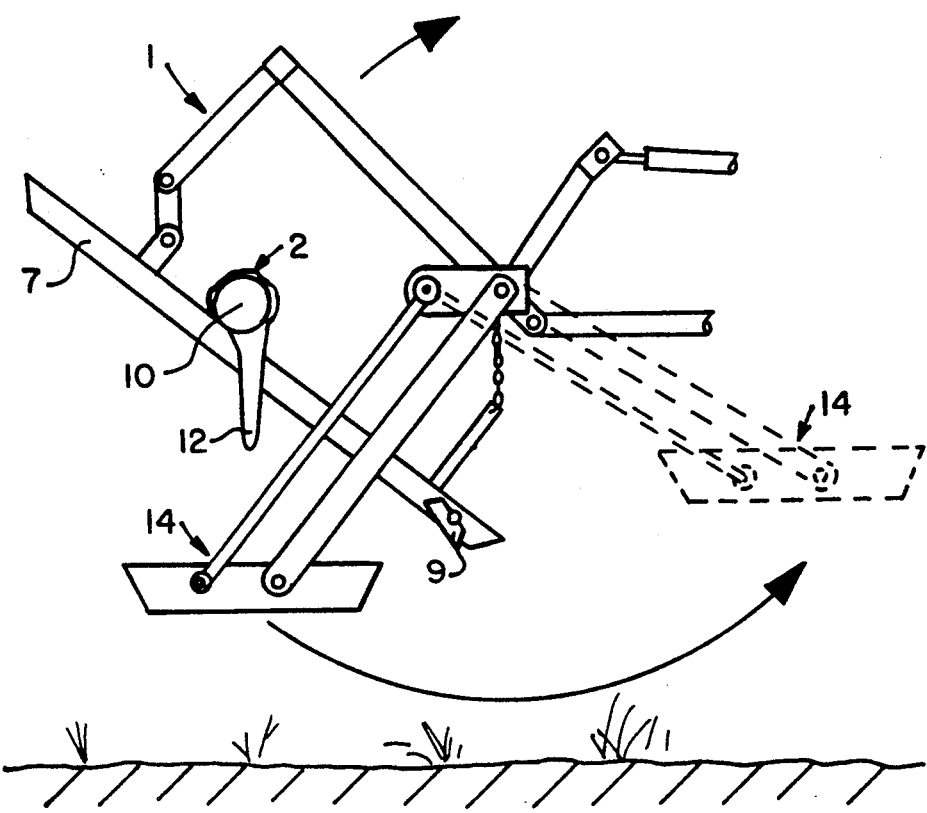
FIG. 3 is a side view of collecting means for use with the first embodiment.

To avoid liquid leakage from the body 2 when the device is temporarily not in use, such as for instance during turning of the tractor on the end field section, the frame 1 can also be provided with collecting means 14 (FIG. 3) which, when the frame 1 is raised up, are moved beneath the liquid transfer body 2.

Figure 4:
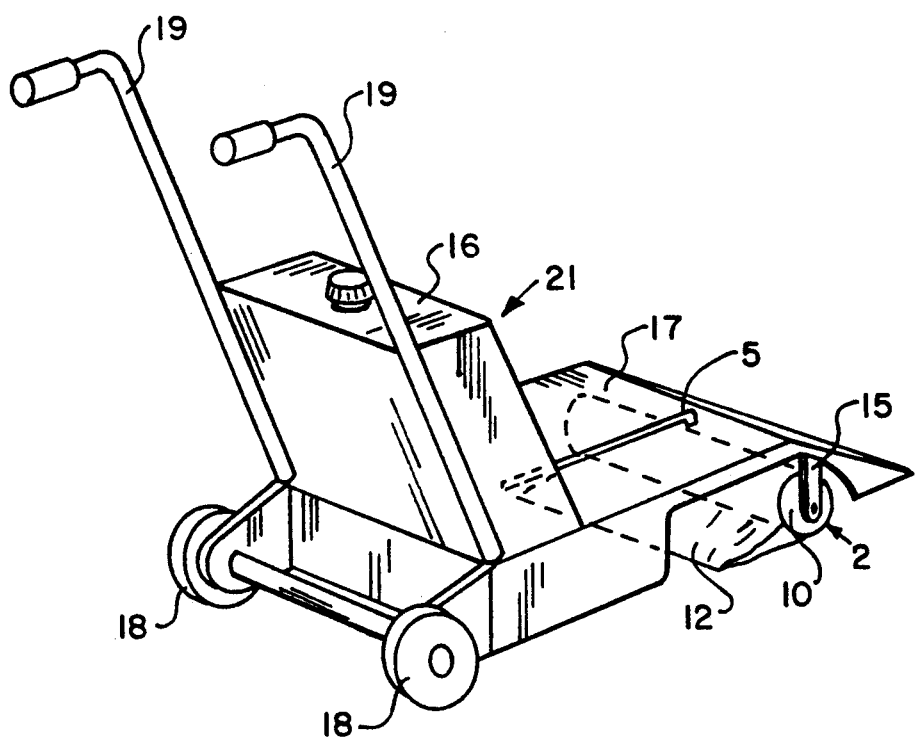
FIG. 4 shows a perspective view of a second embodiment of the device according to the invention.

An embodiment of the device for use on a smaller scale than in agriculture, for instance in private gardens or public parks, comprises a frame 21 (FIG. 4) on which is arranged a single liquid transfer body 2. The latter is connected via a conduit 5 running partly through its suspension elements 15 to the container 16 for the liquid. Frame 21 is provided with wheels 18 and handgrips 19, using which it can be moved simply along a crop for treating. The device further comprises shielding means in the form of a cowling 17 only leaving open the underside of the liquid transfer body 2 in order to also enable use of the device for instance for weed control under low-hanging shrubs.

Figure 5:
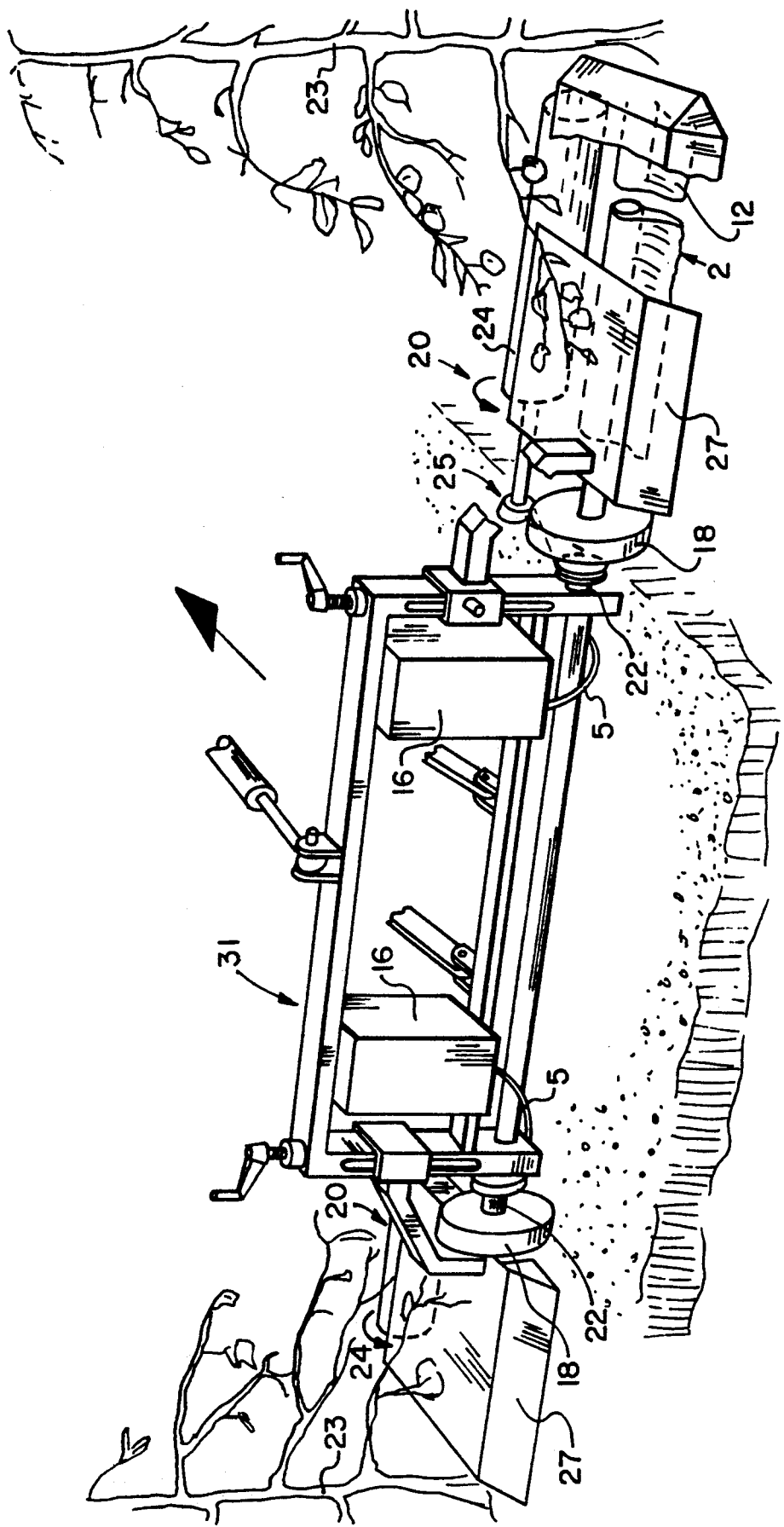
FIG. 5 is a partly cut away, perspective view of a third embodiment of the device according to the invention.

A device according to the invention for use in an orchard (FIG. 5) comprises a frame 31 on which are arranged two liquid transfer bodies 2. Each liquid transfer body 2 is received in a sub-frame 20 height-adjustable relative to the frame 31, and is again connected over a conduit 5 to a liquid container 16. Frame 31 is provided with wheels 18 which are rotatably mounted with an associated shaft 22 in the frame 31. Each sub-frame 20 comprises means for shielding trees 23 not to be treated with the liquid. These shielding means comprise a cowling 27 enclosing the liquid transfer body 2 at the sides and top in addition to a rotatable body 24 which moves low-hanging branches upward out of the path of the liquid transfer body 2. The rotatable body 24 is driven by the wheel shaft 22 over a crosswise belt transmission 25.

Figure 6:
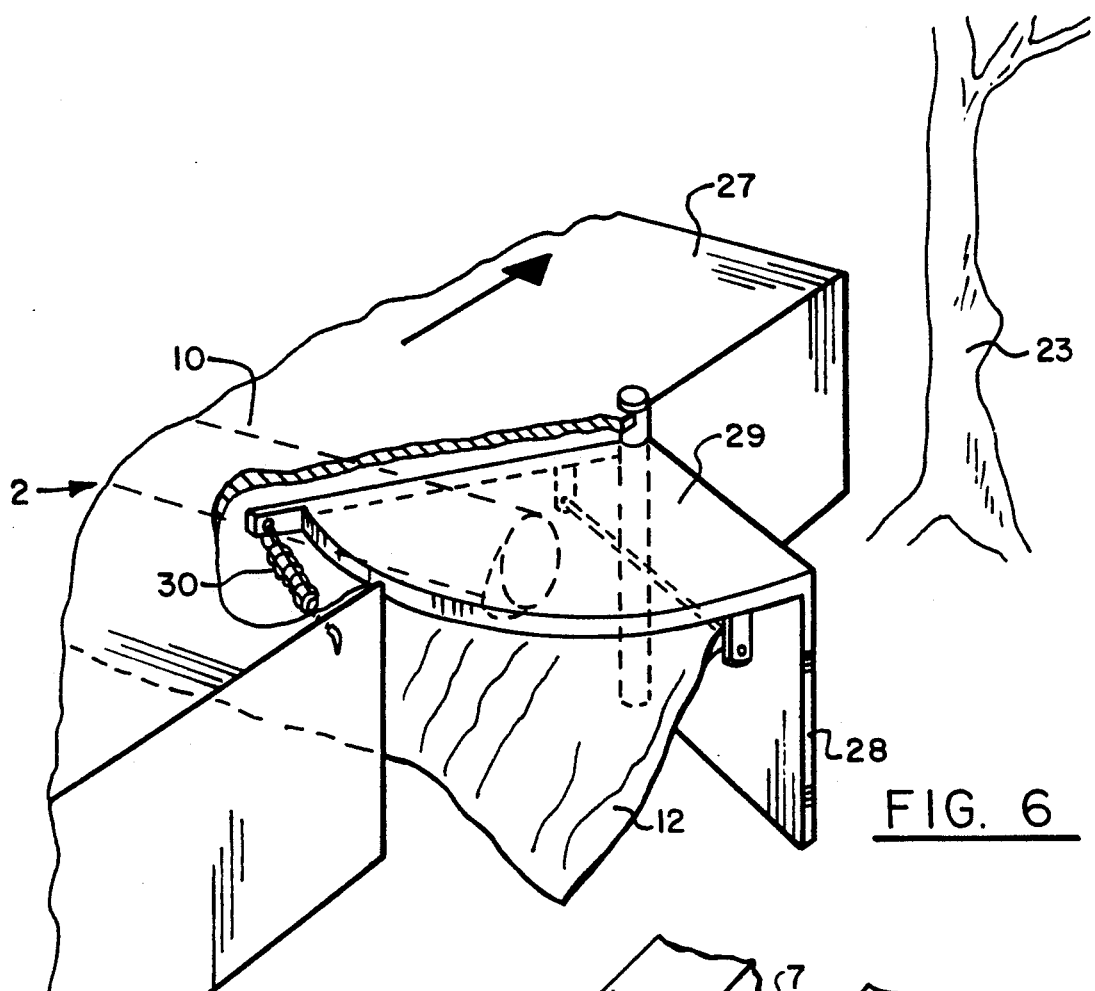
FIG. 6 is a partly cut away, perspective detail view of a fourth embodiment of the device according to the invention.

The frame 31 may also comprise means (not shown here) for adjusting thereof transversely of the operating direction, whereby the device can be made suitable for application in the case of varying intervals between the rows of trees in an orchard. The shielding means can comprise a movable portion 28 (FIG. 6) which is arranged on the cowling 27 pivotably about a standing shaft 29; and which is biased to the shown position by a spring 30. The outer end of the flexible part 12 of the liquid transfer member 2 is fixed to the movable portion 28 of the shielding means. Because the movable portion 28 will be pressed inward counter to the action of the spring 30 when it comes into contact with a tree 23, the entire orchard can be treated with the device shown without the danger of damage to the trees 23 or to the device.

Although in the above described embodiments weeds are shown in each case as the crop for treating with the liquid and the cultivated crop is in each case kept clear of the liquid transfer body 2, it is of course also conceivable that the cultivated crop is treated for instance with a growth stimulating liquid and that weeds are optionally shielded therefrom.

Figure 7:
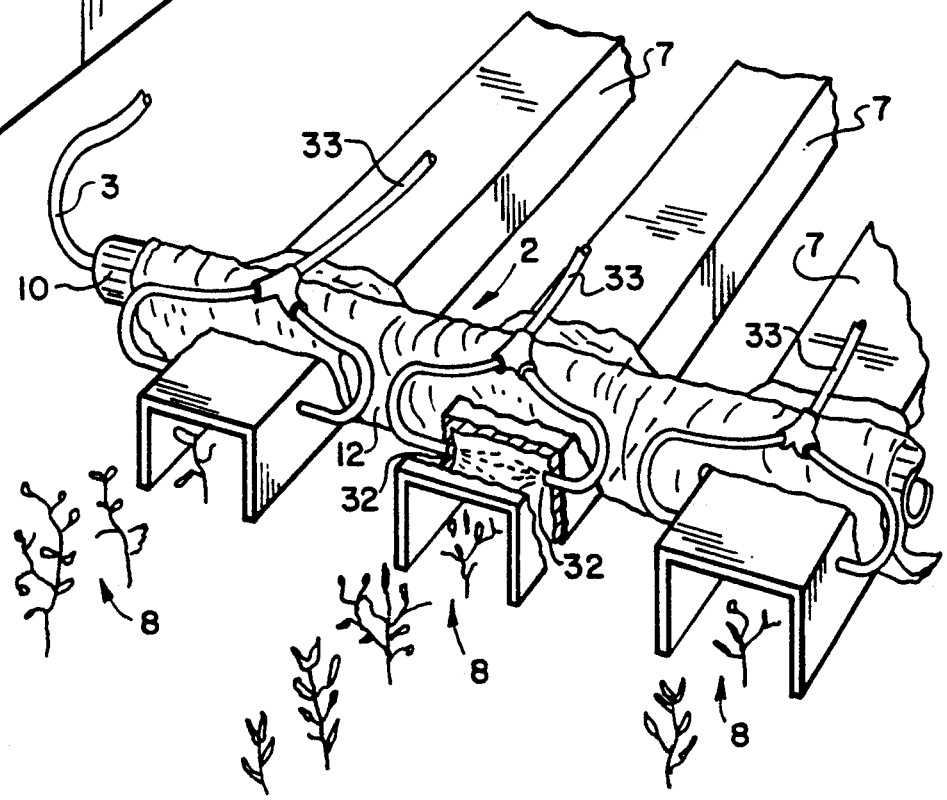
FIG. 7 shows a partly cut away, perspective detail view of a fifth embodiment of the device according to the invention.

It is also possible to simultaneously treat the cultivated crop 8 and weeds growing therebetween with different liquids (FIG. 7). To this end the carriages 7 have spray nozzles 32 into which debouch spray conduits 33. The latter can for instance be connected to a spray device arranged on the tractor and driven by the tractor motor.

I claim:

1. An apparatus for applying liquid to plants to be treated by said liquid, said apparatus comprising:

a frame;

at least one liquid transfer body positioned on said frame which is connected to a container holding said liquid, each said liquid transfer body including a flexible part wherein said flexible part of said liquid transfer body is adapted to come into at least partial contact with said plants to transfer said liquid to said plants; and shield means for shielding plants which are not to be treated with said liquid, said shield means attached to said frame in a position which encloses the top and sides of each said liquid transfer body, said shield means including a rotatable body on a forward end of said shield means.

2. The apparatus of claim 1 wherein said flexible part is a textile material.

3. The apparatus of claim 2 wherein said liquid transfer body further comprises a tubular member for transferring said liquid to said flexible textile material wherein said tubular member is positioned within said flexible textile material with a plurality of openings provided in the upper half of said tubular member.

4. The apparatus of claim 1 wherein said container for holding said liquid is positioned on said frame.

5. The apparatus of claim 1 wherein a plurality of said liquid transfer bodies are provided on said frame.

6. The apparatus of claim 1 wherein each said liquid transfer body is mounted on said frame through a height-adjustable sub-frame.

7. An apparatus for applying liquid to plants to be treated by said liquid comprising:

a frame;

at least one liquid transfer body positioned on said frame which is connected to a container holding said liquid, wherein said liquid transfer body is adapted to come into at least partial contact with said plants to transfer said liquid to said plants, wherein said liquid transfer body includes a flexible part; and shield means for shielding plants which are not to be treated with said liquid, wherein said shield means is attached to said frame in a position which encloses the top and sides of said at least one liquid transfer body, wherein said shield means includes:

a cowling generally enclosing the top and sides of said at least one liquid transfer body;

a movable portion pivotably attached to said cowling movable between an open position extending a reach of said liquid transfer body and a closed position; and a spring attached to said movable portion to bias it toward said open position;

wherein an outer end of said liquid transfer body is coupled to said movable portion.

8. The apparatus of claim 7 wherein said flexible part is a textile material.

9. The apparatus of claim 8 wherein said liquid transfer body further comprises a tubular member for transferring said liquid to said flexible textile material wherein said tubular member is positioned within said flexible textile material with a plurality of openings provided in the upper half of said tubular member.

10. The apparatus of claim 7 wherein said container for holding said liquid is positioned on said frame.

11. The apparatus of claim 7 wherein a plurality of said liquid transfer bodies is provided on said frame.

12. The apparatus of claim 7 wherein each said liquid transfer body is mounted on said frame through a height-adjustable sub-frame.

13. The apparatus of claim 7 wherein said shield means includes a rotatable body on a forward end of said shield means.

* * * * *